(12) United States Patent
Hayashi et al.

(10) Patent No.: US 11,482,018 B2
(45) Date of Patent: Oct. 25, 2022

(54) NUMBER-OF-OCCUPANTS DETECTION SYSTEM, NUMBER-OF-OCCUPANTS DETECTION METHOD, AND PROGRAM

(71) Applicants: NEC CORPORATION, Tokyo (JP); NEC Solution Innovators, Ltd., Tokyo (JP)

(72) Inventors: Haruyuki Hayashi, Tokyo (JP); Michihiko Yusa, Tokyo (JP); Noboru Nakajima, Tokyo (JP)

(73) Assignees: NEC CORPORATION, Tokyo (JP); NEC Solution Innovators, Ltd., Tokyo (JP)

( * ) Notice: Subject to any disclaimer, the term of this patent is extended or adjusted under 35 U.S.C. 154(b) by 107 days.

(21) Appl. No.: 16/631,535

(22) PCT Filed: Oct. 26, 2017

(86) PCT No.: PCT/JP2017/038639
§ 371 (c)(1),
(2) Date: Jan. 16, 2020

(87) PCT Pub. No.: WO2019/016971
PCT Pub. Date: Jan. 24, 2019

(65) Prior Publication Data
US 2020/0234067 A1    Jul. 23, 2020

(30) Foreign Application Priority Data

Jul. 19, 2017  (JP) .............................. JP2017-140226

(51) Int. Cl.
*H04N 9/80* (2006.01)
*G06V 20/59* (2022.01)
(Continued)

(52) U.S. Cl.
CPC ............ *G06V 20/593* (2022.01); *G06T 5/003* (2013.01); *G06T 7/70* (2017.01);
(Continued)

(58) Field of Classification Search
USPC .................................. 386/248, 334; 348/135
See application file for complete search history.

(56) References Cited

U.S. PATENT DOCUMENTS 9,036,040 B1 * 5/2015 Danko .................... G06T 5/009
348/222.1
9,083,850 B1 * 7/2015 Higgs .................... H04N 7/147
(Continued)

FOREIGN PATENT DOCUMENTS

| JP | 2010-224712 A | 10/2010 |
|---|---|---|
| WO | 2014/061195 A1 | 4/2014 |
| WO | 2014/064898 A1 | 5/2014 |

OTHER PUBLICATIONS

F. Tsumuraya et al., "Iterative blind deconvolution method using Lucy's algorithm", Astron. Astrophys., 1994, pp. 688-708, vol. 282.
(Continued)

*Primary Examiner* — Nigar Chowdhury

(57) ABSTRACT

A number-of-occupants detection system (1) includes an image correction unit (120) that generates a corrected image based on an image generated by an imaging unit (110) that images a vehicle traveling on a road having a plurality of lanes by executing correction processing on the image for reducing blurring of a subject captured in the image using a parameter according to a position where the vehicle travels, and a count unit (130) that counts the number of occupants of the vehicle using the corrected image generated by the image correction unit (120).

15 Claims, 14 Drawing Sheets

(51) Int. Cl.
*G06T 7/70* (2017.01)
*H04N 5/232* (2006.01)
*G06T 5/00* (2006.01)
*H04N 5/84* (2006.01)
*H04N 5/89* (2006.01)

(52) U.S. Cl.
CPC ........... *H04N 5/232125* (2018.08); *G06T 2207/30196* (2013.01); *G06T 2207/30236* (2013.01); *G06T 2207/30242* (2013.01); *G06T 2207/30256* (2013.01)

(56) References Cited

U.S. PATENT DOCUMENTS

| | | | | |
|---|---|---|---|---|
| 9,558,212 | B2* | 1/2017 | Nakamura | G06K 9/00295 |
| 9,953,210 | B1* | 4/2018 | Rozploch | G07C 9/253 |
| 2002/0135165 | A1* | 9/2002 | Zayan | B60R 21/01538 |
| | | | | 280/735 |
| 2003/0002746 | A1* | 1/2003 | Kusaka | H04N 5/23248 |
| | | | | 382/255 |
| 2004/0136605 | A1 | 7/2004 | Seger et al. | |
| 2005/0232460 | A1* | 10/2005 | Schmiz | B60R 21/01538 |
| | | | | 382/103 |
| 2008/0294012 | A1* | 11/2008 | Kurtz | A61B 5/444 |
| | | | | 600/300 |
| 2009/0195651 | A1* | 8/2009 | Leonard | B60R 1/00 |
| | | | | 348/148 |
| 2010/0080482 | A1* | 4/2010 | Wong | H04N 5/23212 |
| | | | | 382/255 |
| 2013/0236063 | A1* | 9/2013 | Shin | G08G 1/04 |
| | | | | 382/105 |
| 2013/0278771 | A1* | 10/2013 | Magoun | B60C 11/246 |
| | | | | 348/148 |
| 2013/0314536 | A1* | 11/2013 | Frank | H04N 5/2257 |
| | | | | 348/148 |
| 2014/0112553 | A1* | 4/2014 | Yamaguchi | G06K 9/00362 |
| | | | | 382/118 |
| 2014/0139643 | A1* | 5/2014 | Hogasten | H04N 5/33 |
| | | | | 348/48 |
| 2014/0176663 | A1* | 6/2014 | Cutler | G06T 5/002 |
| | | | | 348/14.07 |
| 2015/0294144 | A1 | 10/2015 | Konishi | |
| 2015/0363655 | A1* | 12/2015 | Artan | G06K 9/00838 |
| | | | | 382/103 |
| 2016/0044245 | A1* | 2/2016 | Tsubaki | H04N 5/23287 |
| | | | | 348/208.11 |
| 2016/0070986 | A1* | 3/2016 | Chidlovskii | G06K 9/6267 |
| | | | | 382/104 |
| 2016/0091978 | A1* | 3/2016 | Park | B60K 37/06 |
| | | | | 345/156 |
| 2016/0142618 | A1* | 5/2016 | Tokui | H04N 5/232125 |
| | | | | 348/349 |
| 2016/0224848 | A1* | 8/2016 | Oh | H04N 5/2251 |
| 2016/0327808 | A1* | 11/2016 | Hatanaka | G02C 7/066 |
| 2017/0032666 | A1* | 2/2017 | Pretorius | G08G 1/04 |
| 2017/0088098 | A1* | 3/2017 | Frank | G06K 9/00362 |
| 2017/0103265 | A1* | 4/2017 | Channah | G06K 9/00771 |
| 2017/0140253 | A1* | 5/2017 | Wshah | G06N 3/08 |
| 2017/0257414 | A1* | 9/2017 | Zaletel | G06F 16/252 |
| 2017/0261318 | A1* | 9/2017 | Takagi | G06V 20/58 |
| 2017/0318260 | A1* | 11/2017 | Torres | H04L 65/403 |
| 2017/0372143 | A1* | 12/2017 | Barcus | G06K 9/00785 |
| 2018/0017791 | A1* | 1/2018 | Beckman | G02B 27/01 |
| 2018/0157918 | A1* | 6/2018 | Levkova | G06V 20/56 |
| 2018/0270413 | A1* | 9/2018 | Sakashita | G06V 20/58 |

OTHER PUBLICATIONS

Michal Hradis et al., "Convolutional Neural Networks for Direct Text Deblurring", Proceedings of BMVC 2015, Swansea, The British Machine Vision Association and Society for Pattern Recognition, 2015.

International Search Report for PCT/JP2017/038639 dated Jan. 16, 2018 [PCT/ISA/210].

Indian Office Action for IN Application No. 202017000533 dated May 27, 2021.

* cited by examiner

FIG. 5

| DISTANCE TO VEHICLE | LANE IDENTIFICATION INFORMATION | PARAMETER FOR CORRECTION PROCESSING |
|---|---|---|
| GREATER THAN OR EQUAL TO $d_0$ AND LESS THAN $d_1$ | FRONT SIDE LANE | ○○○ |
| GREATER THAN OR EQUAL TO $d_1$ AND LESS THAN $d_2$ | CENTER LANE | × × × |
| GREATER THAN OR EQUAL TO $d_2$ AND LESS THAN $d_3$ | BACK SIDE LANE | △△△ |

FIG. 6

| VEHICLE NUMBER | NUMBER OF OCCUPANTS |
|---|---|
| XXX-XXXX | 5 |
| YYY-YYYY | 7 |
| ★ ZZZ-ZZZZ | 1 |

| TIME ZONE | LANE INFORMATION |
|---|---|
| 0:00−6:00 | CENTER LANE |
| 6:00−12:00 | FRONT SIDE LANE |
| 12:00−18:00 | BACK SIDE LANE |
| 18:00−24:00 | CENTER LANE |

NUMBER-OF-OCCUPANTS DETECTION SYSTEM, NUMBER-OF-OCCUPANTS DETECTION METHOD, AND PROGRAM

CROSS REFERENCE TO RELATED APPLICATIONS

This application is a National Stage of International Application No. PCT/JP2017/038639 filed Oct. 26, 2017, claiming priority based on Japanese Patent Application No. 2017-140226, filed Jul. 19, 2017, the disclosures of which are incorporated herein in their entirety by reference.

TECHNICAL FIELD

The present invention relates to a technique for recognizing the number of occupants in a vehicle.

BACKGROUND ART

There is a need to recognize the number of occupants in the vehicle. For example, in Europe and the United States, there is a dedicated lane where a vehicle with more than a certain number of occupants is preferentially treated, such as high-occupancy vehicle (HOV) lane and high-occupancy toll (HOT) lane, and there is a need to recognize the number of occupants of the vehicle traveling on such a lane.

For the need described above, for example, there are techniques described in the following patent documents. In the following Patent Document 1 and Patent Document 2, the technique for detecting the number of occupants of a vehicle by acquiring an image including the vehicle as a subject by an imaging apparatus installed on a side of a road and analyzing the image is disclosed.

RELATED DOCUMENT

Patent Document

[Patent Document 1] Pamphlet of International Publication No. WO2014/064898
[Patent Document 2] Pamphlet of International Publication No. WO2014/061195

SUMMARY OF THE INVENTION

Technical Problem

In the conventional system, it is necessary to install a dedicated camera for each lane in order to detect an occupant of a vehicle on a road having a plurality of lanes. However, a technique that covers the plurality of lanes with a single camera is desired from the viewpoint of installation environment restrictions such as an equipment installation space and system introduction costs. However, when trying to cover the plurality of lanes with a single camera, there is a problem that the camera cannot be focused on some or all of the plurality of lanes, a contour of a subject (vehicle and an occupant of the vehicle) is blurred, and the number of occupants cannot be detected accurately.

An object of the present invention is to provide a technique that enables a single camera to detect the number of occupants of a vehicle using an image captured for a plurality of lanes.

Solution to Problem

According to the present invention, there is provided a number-of-occupants detection system including an image correction unit that generates a corrected image based on an image generated by an imaging unit that images a vehicle traveling on a road having a plurality of lanes by executing correction processing on the image for reducing blurring of a subject captured in the image using a parameter according to a position where the vehicle travels, and a count unit that counts the number of occupants of the vehicle using the corrected image.

According to the present invention, there is provided a number-of-occupants detection method implemented by a computer, including generating a corrected image based on an image generated by an imaging unit that images a vehicle traveling on a road having a plurality of lanes by executing correction processing on the image for reducing blurring of a subject captured in the image using a parameter according to a position where the vehicle travels, and counting the number of occupants of the vehicle using the corrected image.

According to the present invention, there is provided a program for causing a computer to execute the number-of-occupants detection method mentioned above.

Advantageous Effects of Invention

According to the present invention, it becomes possible to detect the number of occupants of a vehicle using an image captured by a single camera for a plurality of lanes.

BRIEF DESCRIPTION OF THE DRAWINGS

The object described above and other objects, features, and advantages will be further clarified by preferred example embodiments described below and the following drawings attached thereto.

FIG. 5 is a diagram illustrating an example of a table used when an image correction unit determines a parameter for correction processing.

FIG. 6 is a diagram illustrating an example of a screen for outputting a count result of the number of occupants by the count unit.

FIG. 13 is a diagram illustrating an example of a table for storing time zones and lanes to be focused in association with each other.

DESCRIPTION OF EMBODIMENTS

Hereinafter, embodiments of the present invention will be described with reference to the drawings. Note that in all of the drawings, the same constituents will be designated by the same reference signs, and descriptions of such constituents will not be repeated. In addition, in each block diagram, unless otherwise particularly described, each block does not represent a hardware unit configuration and represents a function unit configuration.

First Example Embodiment

[Functional Configuration]

Figure 1:
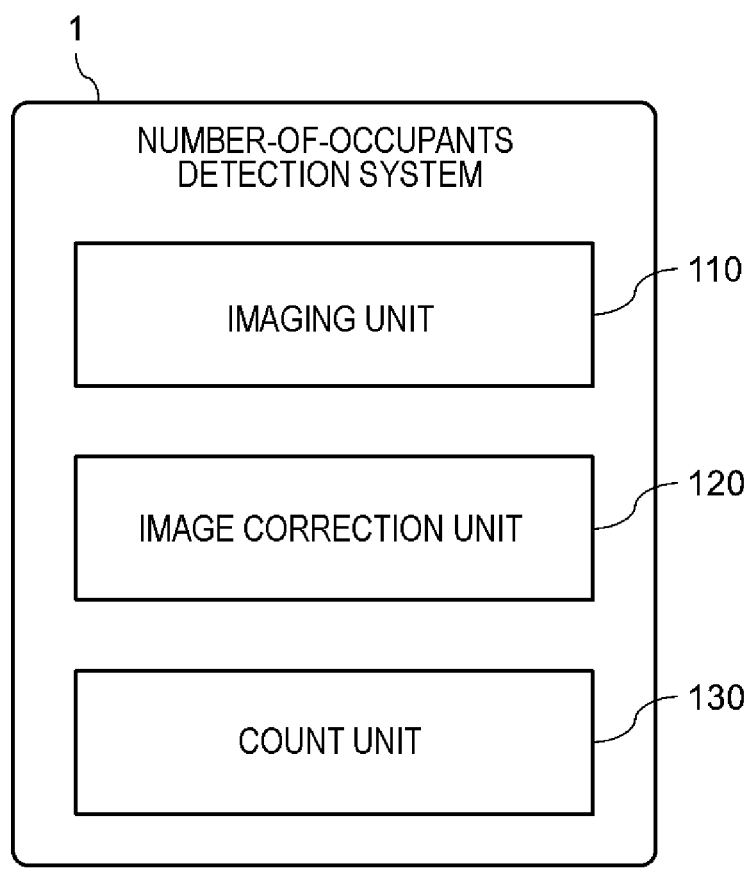
FIG. 1 is a block diagram conceptually illustrating a functional configuration of a number-of-occupants detection system according to a first example embodiment.

FIG. 1 is a block diagram conceptually illustrating a functional configuration of a number-of-occupants detection system 1 of a first example embodiment. As illustrated in FIG. 1, the number-of-occupants detection system 1 is configured to include an imaging unit 11, an image correction unit 120, and a count unit 130.

The imaging unit 110 is an imaging apparatus such as a camera. The imaging unit 110 images a vehicle traveling on a road having a plurality of lanes, and generates an image including the vehicle and a vehicle occupant as subjects. The imaging unit 110 can include the vehicle in an imaging range by, for example, working in conjunction with a vehicle detection sensor (not illustrated). The imaging unit 110 may be configured to continuously capture an image of a vehicle at a predetermined frame rate and generate a plurality of images so that the number of occupants in the vehicle can be accurately recognized.

The image correction unit 120 acquires the image generated by the imaging unit 110. Then, the image correction unit 120 executes correction processing on the image generated by the imaging unit 110 for reducing blurring of the subject in the image, and generates a corrected image based on the image. This correction processing is processing using a so-called blurring correction (Deblur) technique, and can be achieved by using techniques disclosed in the following documents [1] and [2], for example. By using the techniques disclosed in the following documents and the like, the image correction unit 120 can correct, for example, blurring of a subject due to a focus shift and motion blur (blur in an advancing direction of the vehicle) of the subject.

[1] TSUMURAYA, F., MIURA, N., AND BABA, N. 1994. Iterative blind deconvolution method using Lucy's algorithm. Astron. Astrophys. 282, 2 (February), 699-708.

[2] Hradis Michal, Kotera Jan, Zemcik Pavel and Sroubek Filip, Convolutional Neural Networks for Direct Text Deblurring, Proceedings of BMVC 2015, Swansea, The British Machine Vision Association and Society for Pattern Recognition, 2015, ISBN 1-901725-53-7.

The correction processing is executed using a parameter according to a position where the vehicle that is a subject of the image travels. The degree of correction for the image is determined by this parameter.

The count unit 130 uses the corrected image generated by the image correction unit 120 to count the number of occupants of the vehicle that is the subject of the corrected image. The count unit 130 can count the number of occupants of the vehicle based on an image including the vehicle as a subject, for example, using the technique disclosed in Patent Document 1 or Patent Document 2. The image correction unit 120 and the count unit 130 may be collectively referred to as an image processing unit.

As described above, the number-of-occupants detection system 1 according to the present invention does not include the imaging unit 110 such as a camera for each lane. In this case, in some or all of the plurality of lanes, the imaging unit 110 may not be focused on the running subject (vehicle and occupant), and an image being in a state where the subject is blurred may be produced. Therefore, as described in this example embodiment, correction processing for reducing blurring of the subject is executed using the parameter according to the position where the vehicle is traveling. With this configuration, the subject that is blurred due to being away from a focus distance of the imaging unit 110 becomes clear. Note that, for the correction processing for reducing blurring of the subject, for example, high-accuracy processing that can be used for personal authentication is not necessarily required, and it is sufficient if the accuracy to the extent that a person (for example, a face portion of a person) and other regions can be distinguished is ensured. Count processing of the number of occupants of the vehicle that is included in the image as the subject is executed using the image corrected in this way. With such a configuration, it becomes possible to detect the number of occupants of a vehicle for a plurality of lanes with a single imaging apparatus. In addition, the number of imaging apparatuses required for the system can be reduced, the effect of relaxing the restrictions (for example, the size of land) on an installation environment, and the effect of reducing the cost required for the system can also be expected.

Hereinafter, the first example embodiment will be described in more detail.

[Hardware Configuration]

Each functional configuration unit of the number-of-occupants detection system 1 may be implemented by hardware (for example, a hard-wired electronic circuit) implementing each functional configuration unit, or may be implemented by a combination of hardware and software (for example, combination of an electronic circuit and a program controlling the electronic circuit). Hereinafter, a case where each functional configuration unit of the number-of-occupants detection system 1 is implemented by the combination of hardware and software will be further described.

Figure 2:
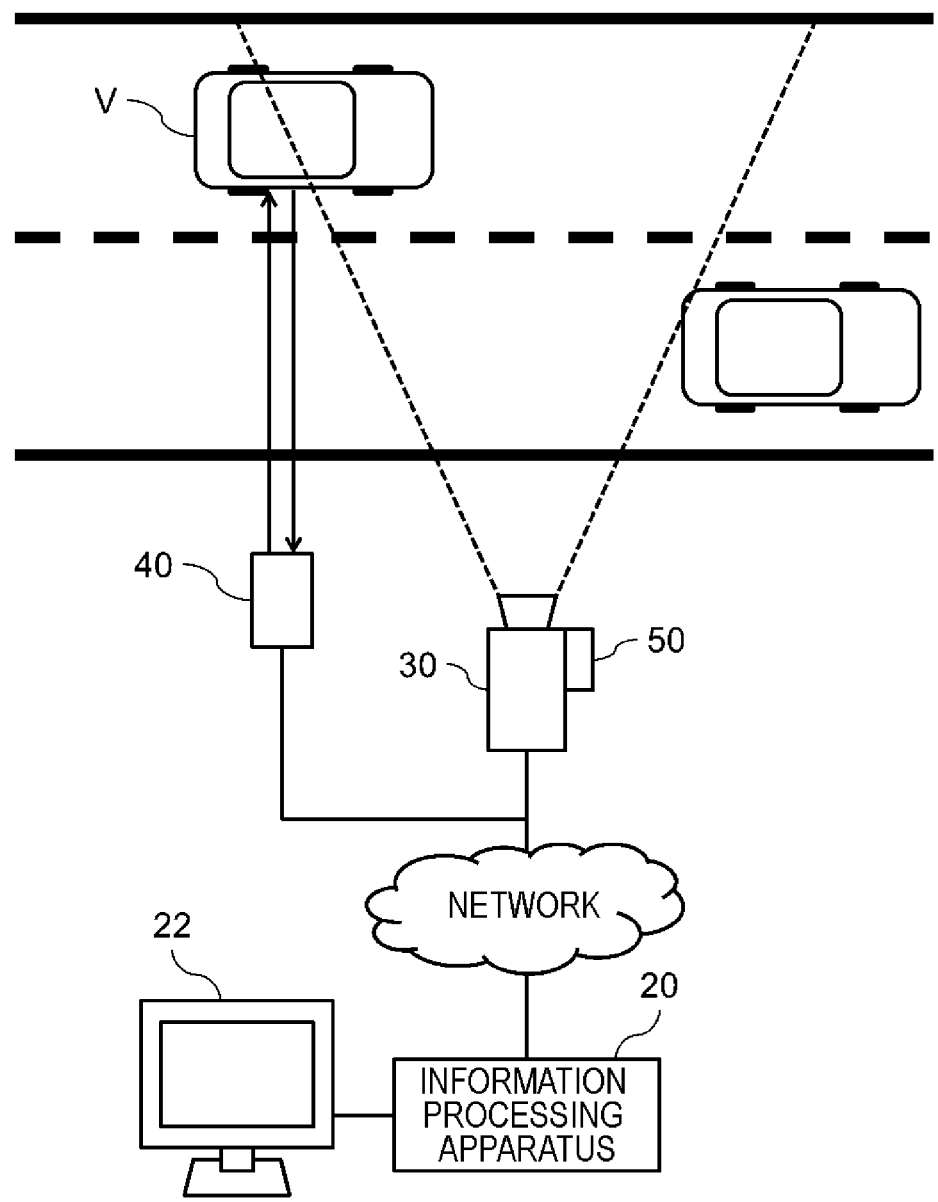
FIG. 2 is a diagram conceptually illustrating a system configuration of the number-of-occupants detection system.

FIG. 2 is a diagram conceptually illustrating a system configuration of the number-of-occupants detection system 1. As illustrated in FIG. 2, the number-of-occupants detection system 1 is configured to include an information processing apparatus 20, an imaging apparatus 30, a vehicle detection sensor 40, and a projector 50. The information processing apparatus 20 is connected to a display apparatus 22 for displaying the result of counting the number of occupants by the count unit 130.

The imaging apparatus 30 corresponds to the imaging unit 110 of the number-of-occupants detection system 1. The imaging apparatus 30 is connected to the information processing device 20 via a network. Although not illustrated, a plurality of imaging apparatus 30 installed in different places can be connected to the information processing device 20.

The vehicle detection sensor 40 is a sensor for detecting a vehicle V that is about to pass in front of the imaging apparatus 30 (to measure the timing of capturing an image).

The vehicle detection sensor 40 may be provided separately from the imaging apparatus 30, or may be incorporated in the imaging apparatus 30.

The projector 50 is provided to clearly capture a person in the vehicle. The projector 50 may be provided separately from the imaging apparatus 30, or may be incorporated in the imaging apparatus 30. The projector 50 may emit light (for example, infrared rays) to the vehicle V that is a subject in conjunction with the imaging timing of the imaging apparatus 30. In the number-of-occupants detection system 1, one common projector 50 to a plurality of lanes may be provided, or a dedicated projector 50 may be provided in each of the plurality of lanes. In the latter case, all the projectors 50 may be controlled to emit light in response to detection of the vehicle V by the vehicle detection sensor 40, or the projector 50 in the lane corresponding to a distance to the vehicle V measured by the vehicle detection sensor 40 may be controlled to emit light.

Figure 3:
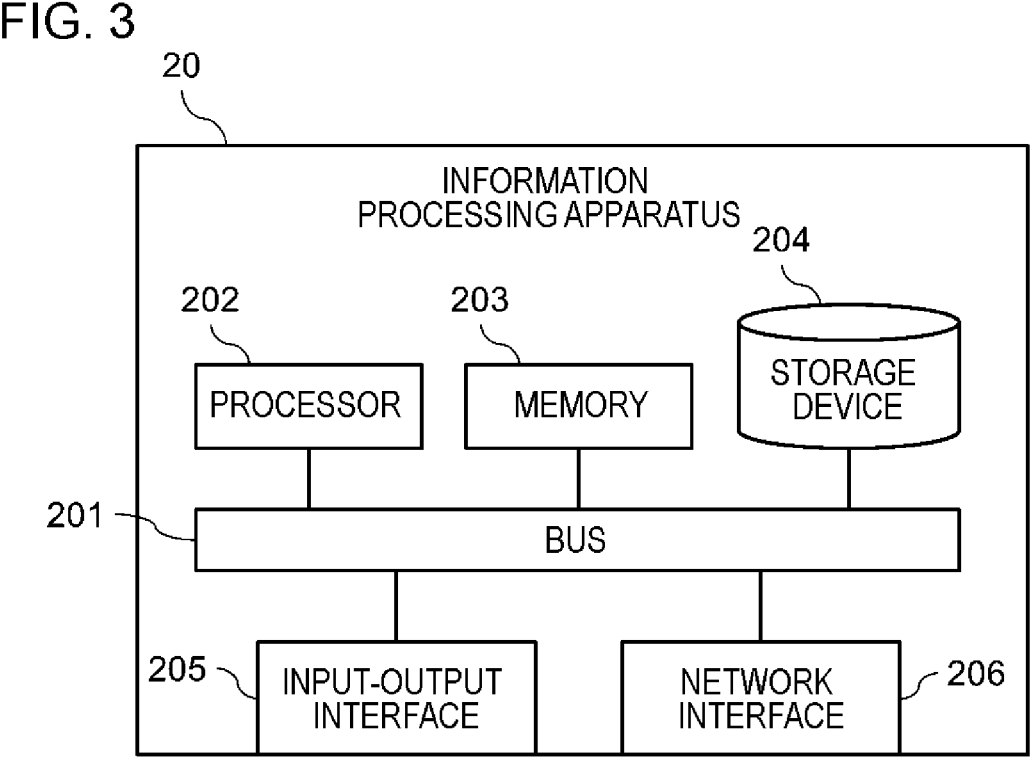
FIG. 3 is a block diagram conceptually illustrating a hardware configuration of an information processing apparatus.

FIG. 3 is a block diagram conceptually illustrating a hardware configuration of the information processing apparatus 20. The information processing apparatus 20 is configured to include a bus 201, a processor 202, a memory 203, a storage device 204, an input-output interface 205, and a network interface 206.

The bus 201 is a data transfer path for transmission and reception of data among the processor 202, the memory 203, the storage device 204, the input-output interface 205, and the network interface 206. A method of connecting the processor 202, the memory 203, the storage device 204, the input-output interface 205, the network interface 206, and the like to each other is not limited to bus connection.

The processor 202 is a processor such as a central processing unit (CPU) or a graphics processing unit (GPU). The memory 203 is a main storage apparatus that is implemented using a random access memory (RAM), a read only memory (ROM), or the like. The storage device 204 is an auxiliary storage apparatus that is implemented using a hard disk drive (HDD), a solid state drive (SSD), a memory card, or the like.

The storage device 204 stores a program module that implements the image correction unit 120 and the count unit 130, and a program module that implements a function of acquiring an image generated by the imaging apparatus 30. The processor 202 implements a function corresponding to each program module by reading each of the program modules into the memory 203 and executing the program module.

The input-output interface 205 is an interface for connecting the information processing apparatus 20 and peripheral apparatuses. For example, a display output device such as a liquid crystal display (LCD) or a cathode ray tube (CRT) display, an input device such as a keyboard or a mouse, or a touch panel integrated with these components can be connected to the information processing apparatus 20 via the input-output interface 205.

The network interface 206 is an interface for connecting the information processing apparatus 20 to various networks such as a local area network (LAN) and a wide area network (WAN). As illustrated in FIG. 2, the information processing apparatus 20 can communicate with the imaging apparatus 30 and other terminals (not illustrated) by connecting to the network via the network interface 206. For example, the information processing apparatus 20 can communicate with the imaging apparatus 30 via the network interface 206 and acquire an image generated by the imaging apparatus 30. In this case, the information processing apparatus 20 is connected to an administrator information processing apparatus (not illustrated) via the network interface 206 so as to be communicable. Then, the detection result of the number of occupants by the count unit 130 is transmitted to the administrator information processing apparatus (not illustrated). Note that, a method of connecting the information processing apparatus 20 to various networks may be a wireless connection or a wired connection.

Note that, FIG. 2 and FIG. 3 are merely examples, and the hardware configuration of the present invention is not limited to the examples of FIGS. 2 and 3. For example, the information processing device 20 and the imaging apparatus 30 may be integrated.

Operation Example

Figure 4:
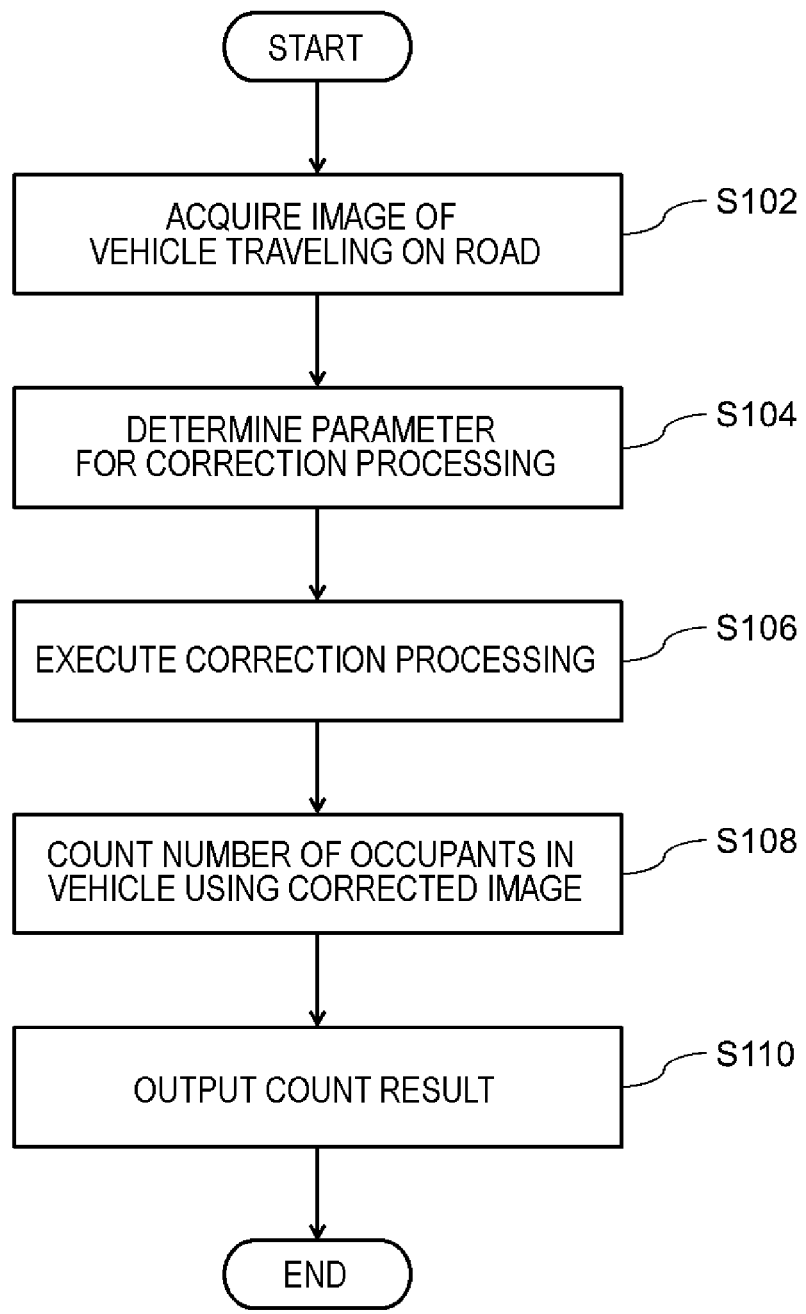
FIG. 4 is a flowchart illustrating an example of a flow of processing in the number-of-occupants detection system of the first example embodiment.

A flow of processing in the number-of-occupants detection system 1 of the first example embodiment will be described using with FIG. 4. FIG. 4 is a flowchart illustrating an example of a flow of the processing in the number-of-occupants detection system 1 of the first example embodiment.

First, the imaging unit 110 images a vehicle traveling on a road and generates an image including the vehicle as a subject (S102). Note that, the imaging unit 110 can detect the presence of a vehicle that is about to pass in front of the imaging unit 110 based on an output signal from the vehicle detection sensor 40 and can determine the timing for capturing an image, for example.

Next, the image correction unit 120 determines a parameter used in the correction processing for the image generated in the processing of S102 (S104).

For example, the image correction unit 120 can determine a lane in which a vehicle included as a subject in the image is traveling based on an output signal (information indicating the distance to the vehicle) from a distance measurement unit (not illustrated) that measures a distance to the vehicle and determine a parameter used for the correction process. In this case, the image correction unit 120 may use the vehicle detection sensor 40 as the distance measurement unit described above. In addition to the vehicle detection sensor 40, a distance sensor that measures the distance to the vehicle is provided as the distance measurement unit, and the image correction unit 120 may determine the lane in which the vehicle is traveling using an output signal from the distance sensor. Although not particularly limited, as an example, the image correction unit 120 can determine the lane in which the vehicle is traveling by referring to a table as illustrated in FIG. 5 based on the distance measured by the distance measurement unit, and determine the parameter used for the correction process.

FIG. 5 is a diagram illustrating an example of a table used when the image correction unit 120 determines a parameter for correction process. In FIG. 5, a table that stores a distance to a vehicle, information indicating each of a plurality of lanes (lane identification information), and parameters for the correction processing in association with each other is illustrated. Note that, in the example of FIG. 5, the "distance to the vehicle" itself can be used instead of the lane identification information. In this case, the "lane identification information" illustrated in FIG. 5 is not necessary. The image correction unit 120 can determine a corresponding row from the table based on the distance to the vehicle indicated by the information acquired from the distance measurement unit, and read the parameter for correction processing stored in the row. As a specific example, when the distance to the vehicle indicated by the information acquired from the distance measurement unit is greater than or equal to $d_1$ and less than $d_2$, the image correction unit 120 can determine the lane in which the vehicle is traveling as the "center lane" and read out the parameter for correction processing associated with the "center lane".

In addition, the image correction unit 120 may determine the parameter according to the distance to the vehicle measured by the distance measurement unit without determining the lane in which the vehicle is traveling. In this case, the image correction unit 120 can acquire information indicating the distance from the distance measurement unit to the vehicle and determine the parameter according to the distance indicated by the information acquired from the distance measurement unit using a function that computes a parameter using the distance as an argument, a table that stores a corresponding parameter defined for each distance, and the like.

The image correction unit 120 can also determine the degree of blurring of an image by analyzing the image generated by the imaging unit 110 and determine a parameter according to the degree of blurring of the image. For example, the image correction unit 120 can acquire information on a spatial frequency of the image by analysis, and determine a correction parameter based on the information. Although not particularly limited, for example, when a blurring function representing a blurring property of an image such as a point spread function is known, the image correction unit 120 can derive a Wiener filter for blurring reduction as indicated in the following equation by decomposing the blurring function of the image into spatial frequency components by Fourier transform.

$$W = \frac{H^*}{|H|^2 + \Gamma} \qquad \text{[Formula 1]}$$

Note that, in the above formula, H indicates the Fourier transform of the blurring function of the image, H* indicates the complex conjugate of the Fourier transform H, and $\Gamma$ indicates a constant to be determined by the SN (Signal to Noise) ratio of the image signal. Note that, the above formula is stored in a predetermined storage region such as the memory 203 or the storage device 204, and the image correction unit 120 can read the formula from the storage region and determine a parameter for reducing blur.

In addition, the image correction unit 120 can acquire information indicating blurring of the subject computed using an autocorrelation function as information indicating the degree of blurring of the image, and determine the parameter for correction process. In this case, the image correction unit 120 can determine a correction parameter using a predetermined function for deriving a parameter for canceling blur by substituting a blur direction and blur amount of an object in the image that can be computed using the autocorrelation function. Note that, the function described above is stored in a predetermined storage region such as the memory 203 or the storage device 204, and the image correction unit 120 can read the function from the storage region and determine the parameter.

Here, when a plurality of vehicles are included as subjects in the image acquired in S102, the image correction unit 120 can determine the parameter for correction processing according to the position of each vehicle using the method described above for each vehicle. For example, it is assumed that an image including two vehicles (first vehicle and second vehicle) traveling on different lanes as subjects is generated by the imaging unit 110. In this case, the image correction unit 120 can determine a plurality of different parameters as parameters to be used for the correction processing according to the lane or position where each vehicle is traveling, or the degree of blurring of each vehicle. Specifically, the image correction unit 120 determines a first parameter for reducing blurring of the first vehicle based on a position where the first vehicle travels and determines a second parameter for reducing blurring of the second vehicle based on a position where the second vehicle travels. Further, when three or more vehicles traveling on different lanes are captured in the image, the image correction unit 120 can determine three or more parameters. Note that, although not particularly limited, the image correction unit 120 can determine that a plurality of vehicles traveling on different lanes are included in the image, using known image processing algorithm for recognizing an object (vehicle) on an image and known image processing algorithm for estimating a position (traveling lane) of the vehicle in real space from an image feature amount (for example, the size on the image) of the vehicle. In addition, the image correction unit 120 compares the timing at which the vehicle detection sensor 40 detects a plurality of vehicles with the timing of capturing by the imaging apparatus 30 (imaging unit 110) and the imaging range of the imaging apparatus 30, thereby capable of determining whether or not a plurality of vehicles are included in the image generated by the capturing.

Then, the image correction unit 120 executes the correction processing on the image generated in the processing of S102 for reducing blurring of the subject, using the parameter determined in the processing of S104 (S106). Here, when a plurality of different parameters are determined in S104, the image correction unit 120 executes the correction processing on the image acquired in S102 using each parameter, and generates a plurality of images corrected by each parameter. For example, it is assumed that an image including two vehicles (first vehicle and second vehicle) traveling on different lanes as subjects is acquired in the processing of S102. In this case, the image correction unit 120 performs the correction processing using each of the first parameter and the second parameter described above. With this configuration, two corrected images (first corrected image and second corrected image) are generated based on the image acquired in the processing of S102. Note that, when three or more vehicles traveling on different lanes are captured in the image, the image correction unit 120 can generate three or more corrected images using three or more parameters.

Then, the count unit 130 processes the corrected image generated in the processing of S106 and counts the number of occupants in the vehicle (S108). Here, when a plurality of corrected images are generated in S106, the count unit 130 processes each of the plurality of corrected images and counts the number of occupants of each vehicle. It is assumed that, for example, in the processing of S106, an image including two vehicles (first vehicle and second vehicle) traveling on different lanes as subjects is acquired, and a first corrected image in which blurring of the first vehicle is reduced and a second corrected image in which blurring of the second vehicle is reduced are generated. In this case, the count unit 130 can count the number of occupants of the first vehicle using the first corrected image and can count the number of occupants of the second vehicle using the second corrected image. Note that, when three or more vehicles traveling on different lanes are captured in the image, the image correction unit 120 counts the number of occupants of each vehicle using three or more corrected images, respectively.

Then, the count unit 130 outputs the result of counting the number of occupants in the vehicle (S110). For example, the count unit 130 can display a screen as illustrated in FIG. 6 on a display apparatus 22 connected to the information processing device 20.

FIG. 6 is a diagram illustrating an example of a screen for outputting the result of counting the number of occupants by the count unit 130. In FIG. 6, a screen that displays a number of the number plate of a vehicle and the number of occupants of the vehicle counted by the count unit 130 is illustrated. Note that, the number of the number plate of the vehicle can be acquired as text information or the like by analyzing an image, which is captured by the imaging unit 110 or another imaging apparatus (not illustrated) and in which the number of the number plate of the vehicle is captured.

Here, when a lane in which a certain vehicle is traveling is an HOV lane or a HOT lane and the number of occupants of the vehicle is less than a prescribed number of persons, the count unit 130 may include specific additional information indicating that the number of occupants is less than the prescribed number of persons in the information on the number of occupants of the vehicle. The count unit 130 can compare, for example, information on the prescribed number of persons stored in the memory 203 in advance with the number of occupants of the vehicle counted based on the image to determine whether the number of occupants of the vehicle is greater than or equal to the prescribed number of persons. Then, the information processing apparatus 20 may be configured to give a predetermined mark M as illustrated in FIG. 6 according to the presence or absence of additional information and display information on a vehicle whose number of occupants is less than a prescribed value and information on other vehicles distinguishably from each other. In addition, the information processing apparatus 20 can display information on a vehicle whose number of occupants is less than a prescribed value and information on other vehicles distinguishably from each other by changing a character color, a background color, or the like according to the presence or absence of additional information. According to such a screen, a person in charge can easily recognize the existence of a vehicle traveling on the HOV lane or the HOT lane with the number of occupants less than the prescribed number of persons. In addition, the information processing apparatus 20 may be configured to update display on the screen and output a predetermined buzzer sound when additional information is added to the count result of the number of occupants output from the count unit 130. With this configuration, it becomes easier for a person who operates the information processing apparatus 20 to notice the presence of a vehicle traveling on the HOV lane or the HOT lane with the number of occupants less than the prescribed number of persons.

Specific Example

Hereinafter, a specific example of the number-of-occupants detection system 1 of this example embodiment will be described.

First Specific Example

Figure 7:
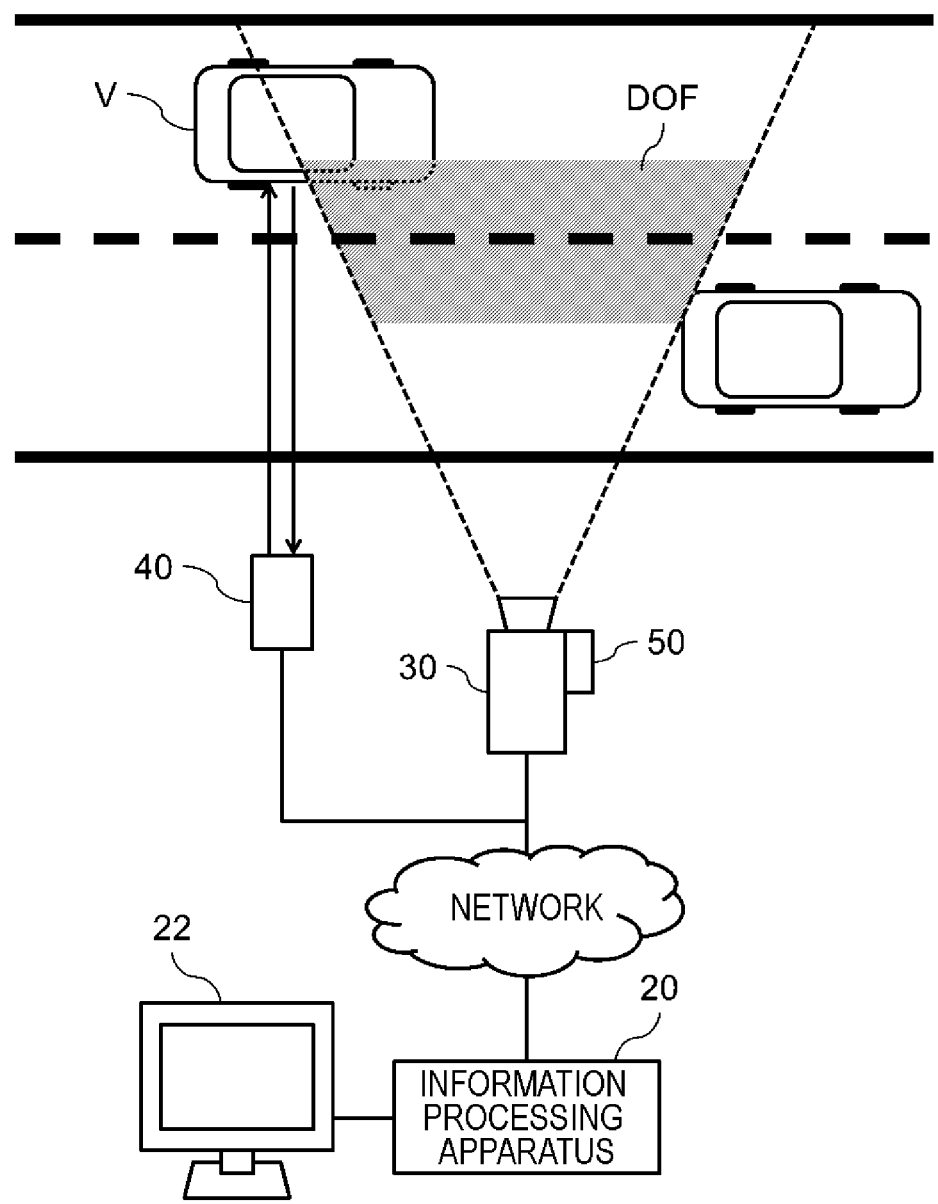
FIG. 7 is a diagram conceptually illustrating a configuration of a first specific example.

In a road having a plurality of lanes, if the focus distance of the imaging unit 110 is fixed at a distance corresponding to the central portion (for example, if the number of lanes is an even number, the lane boundary part, and if the number of lanes is an odd number, the lane positioned in the center) of a plurality of lanes, the maximum value of the amount of blurring of the vehicle captured in an image is suppressed, and thus it becomes possible to reduce the overall amount of blurring correction process. In this specific example, in order to simplify the description, a case where the focus of the imaging unit 110 is fixed at the center portion (for example, a lane boundary line) of two lanes on a road having the two lanes will be described as an example. FIG. 7 is a diagram conceptually illustrating a configuration of the first specific example. A hatched region in FIG. 7 indicates the focus distance (depth of field DOF) of the imaging apparatus 30 (imaging unit 110). A subject positioned outside the range of the depth of field DOF is imaged in a blurred state.

In this specific example, for example, two parameters for correction processing optimized for the respective two lanes are prepared in the memory 203 in advance. The parameter for correction processing corresponding to each of the two lanes can be determined based on, for example, the difference between an average vehicle travel position in each lane and the focus distance of the imaging unit 110. Specifically, the parameter of the back side lane with respect to the position of the imaging unit 110 is prepared as a parameter for canceling blurring of the image that occurs when the position of the subject is on the back side of the focused position (near the lane boundary). The parameter of the front side lane with respect to the position of the imaging unit 110 is prepared as a parameter for canceling blurring of the image that occurs when the position of the subject is on the front side of the focused position (near the lane boundary).

In the case of this specific example, the imaging unit 110 is not focused on either lane. Therefore, regardless of which lane the vehicle is traveling on, the contour of the subject (vehicle and occupant of the vehicle) may be blurred in the image generated by the imaging unit 110. However, in the case of this specific example, the amount of blurring (degree of blurring) can be reduced as compared with the case where any lane is focused. For example, when the vehicle is traveling in the first lane, the shift from the focus distance of the imaging unit 110 is smaller when the focus distance of the imaging unit 110 is adjusted to the vicinity of the center boundary line (that is, the central portion of the plurality of lanes) than when the focus distance of the imaging unit 110 is adjusted to the other second lane. For that reason, the amount of blurring of the subject in the image is reduced. With this configuration, there is an advantage that the image acquired by the imaging unit 110 can be well corrected with a small processing amount.

Second Specific Example

Figure 8:
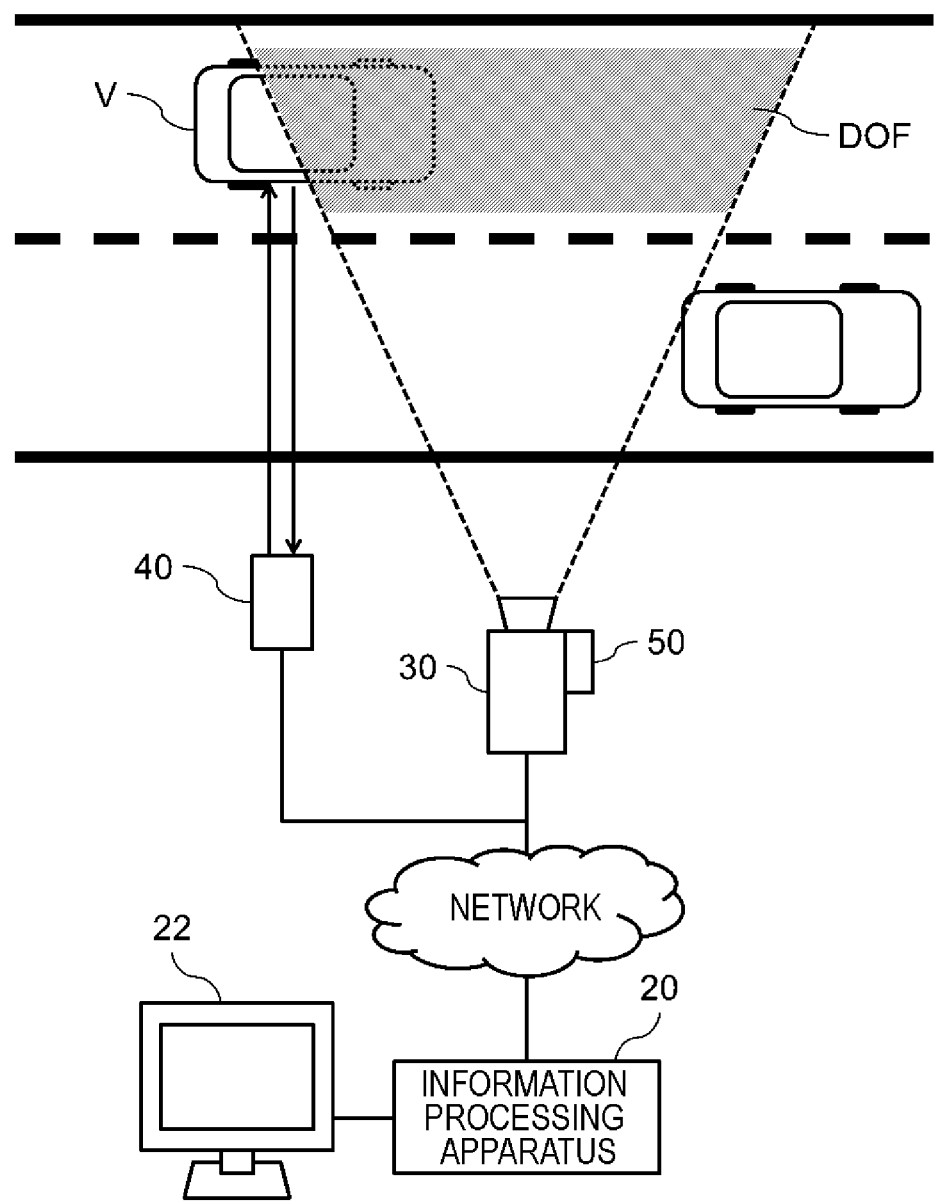
FIG. 8 is a diagram conceptually illustrating a configuration of a second specific example.

In this specific example, a case where the focus distance of the imaging unit 110 is fixed at a distance corresponding to one predetermined lane among a plurality of lanes will be described as an example. Specifically, a case where the focus of the imaging unit 110 is fixed at any one of the two lanes on a road having two lanes will be described as an example. FIG. 8 is a diagram conceptually illustrating a configuration of the second specific example. A hatched region in FIG. 8 indicates the focus distance (depth of field DOF) of the imaging apparatus 30 (imaging unit 110). A subject positioned outside the range of the depth of field DOF is imaged in a blurred state.

In this specific example, when a vehicle traveling on a lane to which a focus is fixed is imaged, a clear image can be acquired to some extent, and thus, in many cases, the correction processing may not be executed. On the other hand, when a vehicle traveling on the lane to which the focus is not fixed is imaged, there is a high possibility that the correction processing for reducing blurring of the subject is necessary. Here, which lane the focus of the imaging unit 110 is fixed at can be determined, for example, based on a statistical value of a traffic volume of each lane. By fixing the focus of the imaging unit 110 to the lane having the statistically large traffic volume, it is possible to reduce execution frequency of the correction processing on the image and reduce the overall processing amount. In this case, when a vehicle traveling on a lane to which the focus of the imaging unit 110 is fixed is imaged, the image correction unit 120 performs a processing of confirming whether the subject (the vehicle or the vehicle occupant) is out of focus. Specifically, the image correction unit 120 can determine whether or not the image is blurred by, for example, the following process. As an example, as a result of decomposing the image generated by the imaging unit 110 into spatial frequency components by Fourier transform, when a distribution with few low frequency components and many high frequency components is obtained, the image correction unit 120 can determine that the image is not blurred. As another example, the image correction unit 120 can determine that the image is not blurred when the half-value width of the autocorrelation function of the image is less than or equal to a predetermined threshold value. As still another example, as a result of estimating the blurring function (for example, a point spread function) of the image, when an impulse (that is, a delta function) or a function (a function whose half width is a predetermined threshold value or less) of a waveform close to the impulse is obtained, the image correction unit 120 can determine that the image is not blurred. Note that, the processing amount of these processes is smaller than the processing amount of the correction processing for reducing blurring of the subject. Therefore, the overall processing amount in this specific example is smaller than when the correction processing is performed on all lanes (for example, the case of the first specific example).

For a road having three or more lanes, the focus distance of the imaging unit 110 is fixed at a distance corresponding to the lane positioned on the center side, and the effect described in the first specific example is also obtained.

Third Specific Example

A subject may be blurred due to differences in a seat position of vehicle. For example, an amount of shift from the focus distance of the imaging unit 110 differs between the seat position on a driver's seat side and the seat position on an passenger's seat side. Then, the degree of blurring of the contour of the subject (person in the vehicle) changes depending on the amount of shift from the focus distance. Here, a case where the correction processing is executed using parameters that take this difference into consideration is illustrated.

In this specific example, the parameter according to the position used by the image correction unit 120 for the correction processing is configured by a plurality of parameters according to the position in the vehicle. For example, the parameter for correction processing is configured to include a first in-vehicle position parameter for reducing blurring of the subject in the image on the basis of the driver' seat side, and a second in-vehicle position parameter for reducing blurring of the subject on the basis of the passenger's seat side.

In this specific example, when the lane in which the vehicle is traveling is determined, the image correction unit 120 reads a parameter set (first in-vehicle position parameter and second in-vehicle position parameter) corresponding to the lane. This parameter set is stored in the memory 203 or the storage device 204, for example. Then, the image correction unit 120 executes the correction processing on the image using each of the read first in-vehicle position parameter and second read in-vehicle position parameter. With this configuration, a plurality of corrected images based on a plurality of parameters corresponding to the in-vehicle positions are generated for a single image captured at certain timing.

In this specific example, the count unit 130 counts the number of occupants of the vehicle using the plurality of images generated using the first in-vehicle position parameter and second in-vehicle position parameter, respectively.

Specifically, the count unit 130 can count the number of occupants of the vehicle using a plurality of corrected images as follows. First, the count unit 130 counts the number of occupants for each of a plurality of corrected images generated by correcting one image captured at the certain timing based on correction processing parameter corresponding to a position in the vehicle. Next, the count unit 130 integrates the number of occupants counted using the respective corrected images, and determines the final number of occupants of the vehicle counted from one image. For example, as a result of comparing the position in the respective images for a person detected in one corrected image and a person detected in another corrected image, when the positions are substantially equal (the position difference between the plurality of corrected images is less than or equal to a predetermined threshold value), the count unit 130 determines these persons as the same person and counts the persons as one person. Further, as a result of comparing the positions in the respective images of the person detected in one corrected image and the person detected in the other corrected image, when the positions of these persons are different (the position difference between the plurality of corrected images exceeds a predetermined threshold value), the count unit 130 determines these persons as different persons and counts these persons individually.

Figure 9:
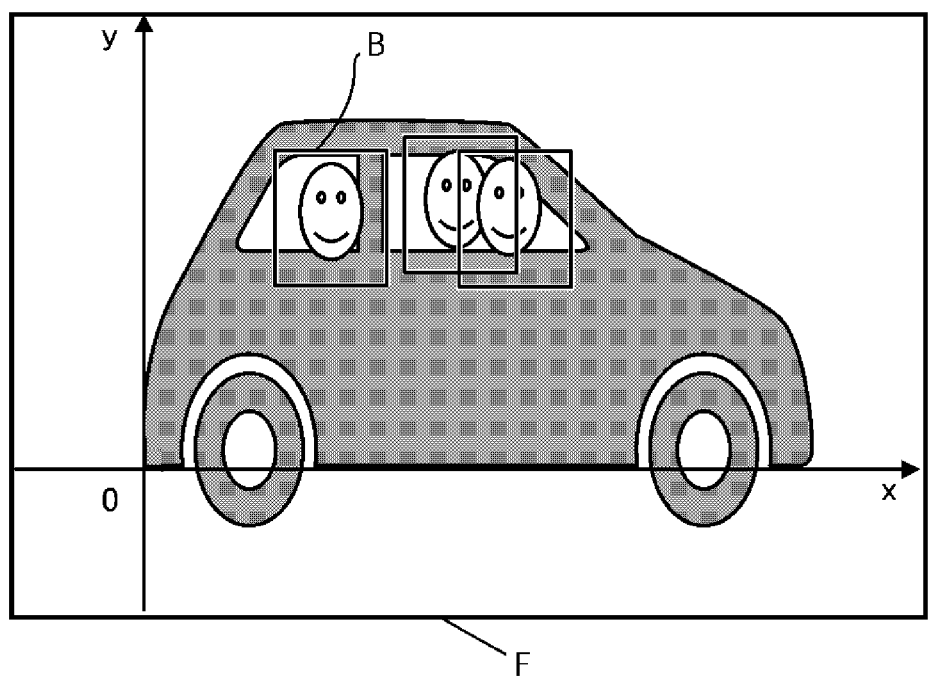
FIG. 9 is a diagram illustrating an example of a vehicle coordinate system set in a corrected image generated by an image correction unit.

Note that, although not particularly limited, the image correction unit 120 can detect a reference point and a reference direction of the vehicle from each of the plurality of corrected images, and determine the positional relationship of a person among a plurality of corrected images by defining a two-dimensional coordinate system (vehicle coordinate system) with the detected reference point as the origin and the detected reference direction as the x-axis direction and y-axis direction for each image. Hereinafter, an example of the reference point and the reference direction will be described with reference to FIG. 9. FIG. 9 is a diagram illustrating an example of a vehicle coordinate system set in a corrected image F generated by the image correction unit 120. In the illustrated example, the rear end portion of the bumper attached to the back of a vehicle body is used as a reference point, and the front-and-rear direction and height direction of the vehicle are used as reference directions. The vehicle coordinate system is defined in which the rear end portion of the bumper is the origin, the front-and-rear direction of the vehicle is the x-axis, and the height direction thereof is the y-axis. Note that, the reference point and the reference direction are not limited to the illustrated example. For example, the reference point may be a predetermined part such as a front pillar, a center pillar, a rear pillar, or a side mirror. The reference direction can be set in an optional direction on the image. The image correction unit 120 can determine the position coordinates of a person region B detected from the image in the vehicle coordinate system as illustrated.

In this example embodiment, a plurality of corrected images are generated by executing the correction processing on an image using a plurality of parameters that take the difference in seat position in the vehicle into consideration. By doing in this way, it becomes possible to eliminate blurring of the contour of the subject due to the difference in the seat position in the vehicle, and to accurately count the number of occupants in the vehicle.

Second Example Embodiment

In the second specific example of the first example embodiment, a specific example in which the focus of the imaging unit 110 is fixed at a predetermined lane has been described. In this example embodiment, a configuration in which a processing unit that controls the focus of the imaging unit 110 based on a predetermined condition is included will be described.

[Functional Configuration]

Figure 10:
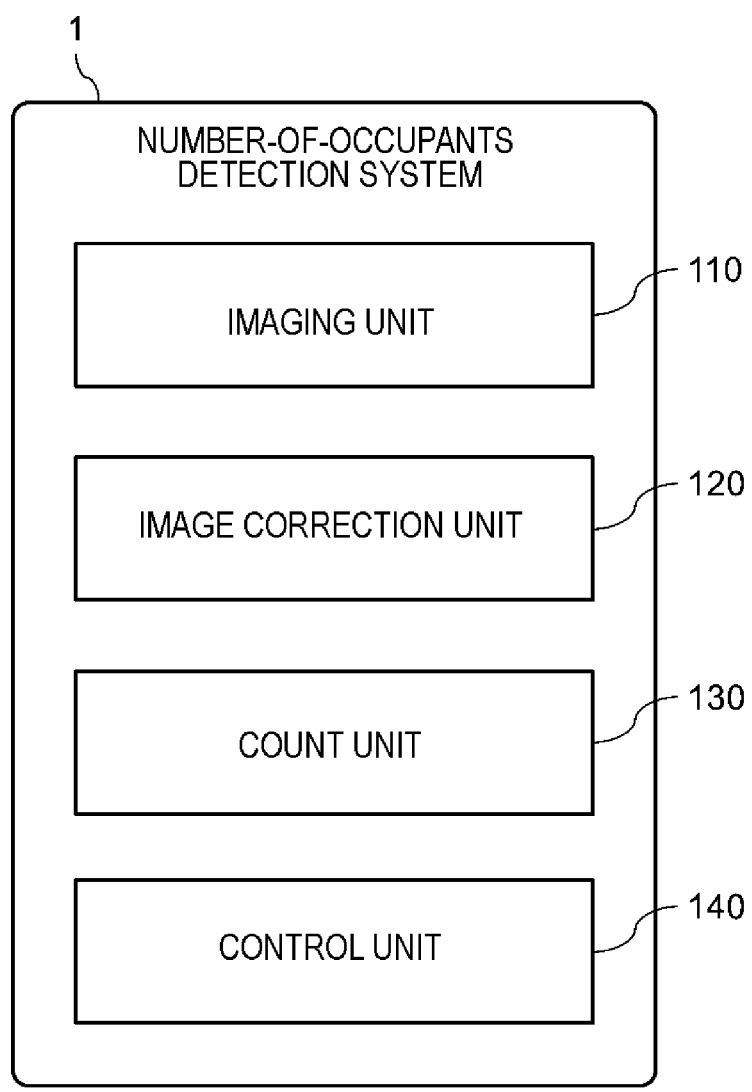
FIG. 10 is a block diagram conceptually illustrating a functional configuration of a number-of-occupants detection system of a second example embodiment.

FIG. 10 is a block diagram conceptually illustrating a functional configuration of the number-of-occupants detection system 1 of a second example embodiment. As illustrated in FIG. 10, the number-of-occupants detection system 1 of this example embodiment further includes a control unit 140 in addition to the configuration of the first example embodiment.

As an example, the control unit 140 can switch a lane on which the imaging unit 110 is focused based on the traffic volume of each of the plurality of lanes for a predetermined time. In this case, the control unit 140 can compute the traffic volume for a predetermined time for each lane using the image generated by the imaging unit 110, the output of the vehicle detection sensor 40, or the like. As an example, the control unit 140 can compute the traffic volume for each lane for a predetermined time using the distance to the vehicle measured using the vehicle detection sensor 40 or the like as follows. First, the control unit 140 refers to a predetermined table (for example, FIG. 5) that defines the correspondence between the distance to the vehicle and the travel lane, and determines the lane in which the vehicle is traveling. Then, the control unit 140 accumulates the number of times each lane is determined in a predetermined storage region such as the memory 203. By continuing these processes for a predetermined time, information indicating the traffic volume for each lane for a predetermined time can be stored in a predetermined storage area. As another example, the control unit 140 may compute the traffic volume for each lane for a predetermined time based on an analysis result of the image generated by the imaging unit 110 or the like. Specifically, the control unit 140 can determine the travel lane of the vehicle included in the image generated by the imaging unit 110 or the like using known image processing algorithm that estimates the position (traveling lane) of a vehicle in the real space based on the image feature amount (for example, the size on the image) of the vehicle. Then, the control unit 140 can compute the traffic volume for each lane for the predetermined time by counting the number of vehicles determined in each lane within the predetermined time. Note that, the predetermined time can be optionally determined.

As another example, the control unit 140 may be configured to switch the lane on which the imaging unit 110 is focused according to the date or time. Specifically, a lane to be focused on is determined for each time zone based on a result of an investigating a change in traffic volume of each lane in advance. For example, the information indicating the lane determined as such is prepared in the memory 203 or the like in a state where the information is associated with information indicating a time zone. The control unit 140 can acquire the current time and then refer to the information prepared in the memory 203 to transmit an instruction to focus on the lane corresponding to the current time to the imaging unit 110.

[Hardware Configuration]

The hardware configuration of this example embodiment is the same as that of the first example embodiment (for example, FIGS. 2 and 3). In this example embodiment, the storage device 204 of the information processing apparatus 20 further stores a program module that achieves the function of the control unit 140 described above. The function of the control unit 140 described above is achieved by the processor 202 of the information processing apparatus 20 executing the program module.

Operation Example

Figure 11:
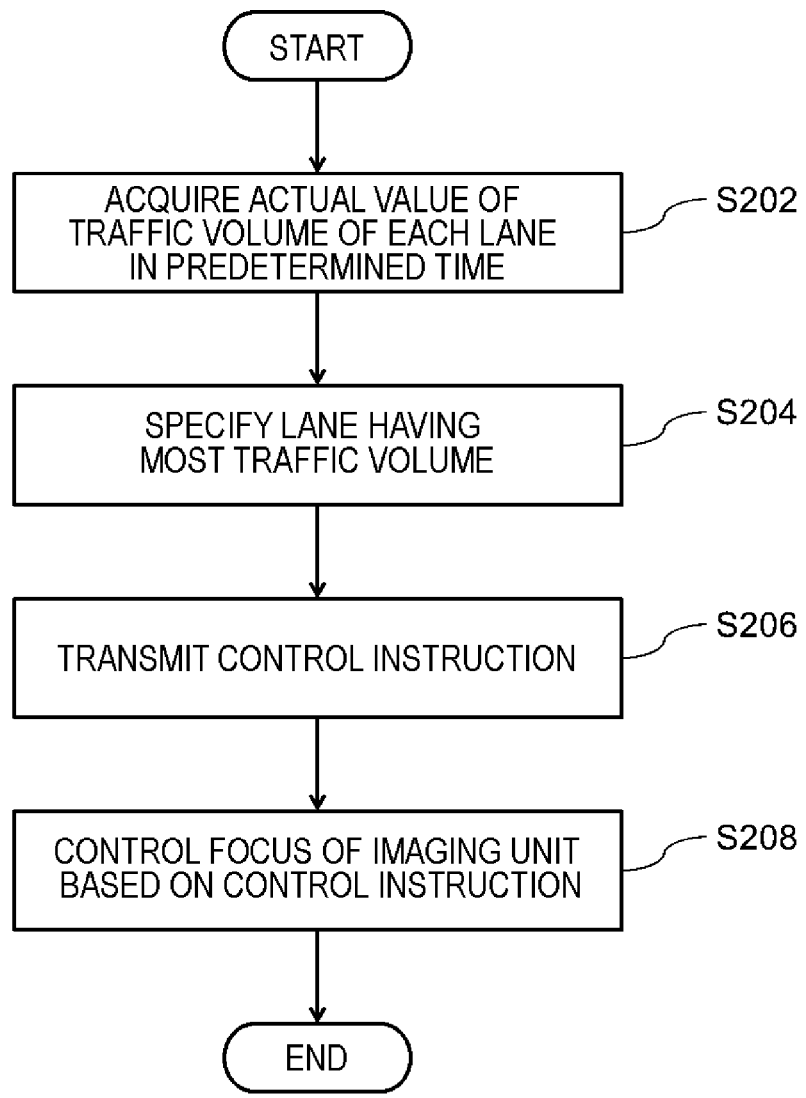
FIG. 11 is a flowchart illustrating a flow of processing in the number-of-occupants detection system of the second example embodiment.
Figure 12:
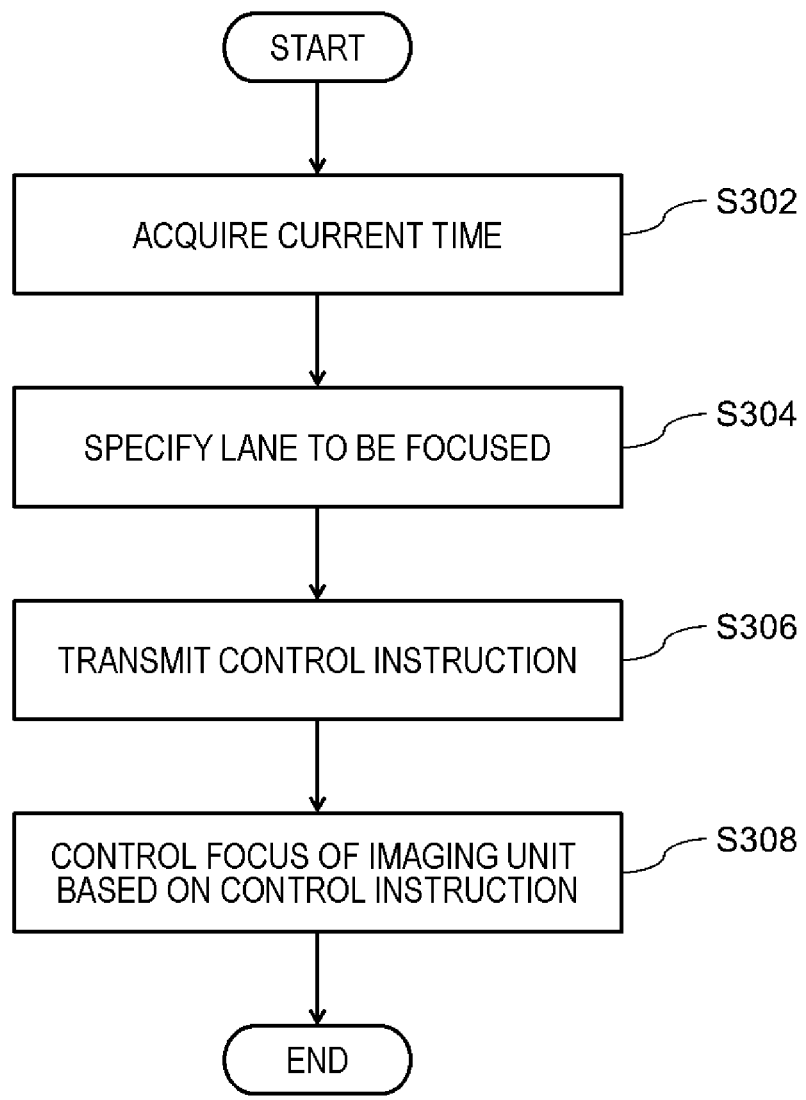
FIG. 12 is a flowchart illustrating a flow of processing in the number-of-occupants detection system of the second example embodiment.

A processing of the number-of-occupants detection system 1 of this example embodiment will be described with reference to FIGS. 11 and 12. FIGS. 11 and 12 are flowcharts illustrating the flow of the processing in the number-of-occupants detection system 1 of the second example embodiment. In the flowchart in FIG. 11, a flow in which the control unit 140 controls the lane on which the imaging unit 110 is focused based on the traffic volume of each of the plurality of lanes for a predetermined time is described. In the flowchart of FIG. 12, a flow in which the control unit 140 controls the lane on which the imaging unit 110 is focused according to the date or time is described.

First, a flow in which the control unit 140 controls the lane on which the imaging unit 110 is focused based on the traffic volume of each of the plurality of lanes for a predetermined time will be described.

First, the control unit 140 acquires information indicating the traffic volume of each lane in a predetermined time (S202). For example, the control unit 140 can add up the number of vehicles passing every predetermined time for each lane, based on the analysis result of the image of the imaging unit 110 or the output signal of the vehicle detection sensor 40. The control unit 140 may acquire the traffic volume of each lane at a predetermined time from an external device (not illustrated) by communicating with the external device. The control unit 140 compares the traffic volume of each lane in the predetermined time acquired by the processing of S202, and determines the lane with the most traffic volume in the predetermined time (S204). Then, the control unit 140 transmits a control instruction to focus on the lane determined in the processing of S204 to the imaging unit 110 (S206). The imaging unit 110 controls a focus mechanism in accordance with the control instruction from the control unit 140, and focuses on the lane indicated by the control instruction (S208).

Next, a flow in which the control unit 140 controls the lane on which the imaging unit 110 is focused according to the time zone will be described.

First, the control unit 140 acquires the current time by synchronizing with a network time protocol (NTP) server (not illustrated) (S302). Then, based on the current time acquired in the processing of S302, the control unit 140 refers to a table as illustrated in FIG. 13, for example, and determines a lane to be focused (S304). FIG. 13 is a diagram illustrating an example of a table that stores time zones and lanes to be focused in association with each other. Since the traffic state can be influenced by the day of the week and the weather, a plurality of tables may be prepared for each day of the week or for each type of weather. For example, traffic volume is expected to increase during long holidays such as Golden Week and Bon holidays. Therefore, a table used during such a long vacation period may be further prepared. Then, the control unit 140 transmits a control instruction to focus on the lane determined in the processing of S304 to the imaging unit 110 (S306). The imaging unit 110 controls the focus mechanism in accordance with the control instruction from the control unit 140, and focuses on the lane indicated by the control instruction (S308). After that, when the image of the vehicle traveling in each lane is generated by the imaging unit 110, correction processing for reducing blurring of the subject as described in the second specific example of the first example embodiment may be executed on the image. In this case, correction processing using a plurality of parameters according to the position in the vehicle, as described in the third specific example of the first example embodiment may be executed.

As described above, in this example embodiment, the imaging unit 110 is controlled to be focused on a lane with a large amount of traffic based on the traffic volume for a predetermined time, the date and time, or the traffic volume statistics for each time. With this configuration, the execution frequency of the correction processing on the image can be reduced, and the overall processing amount can be reduced.

Figure 14:
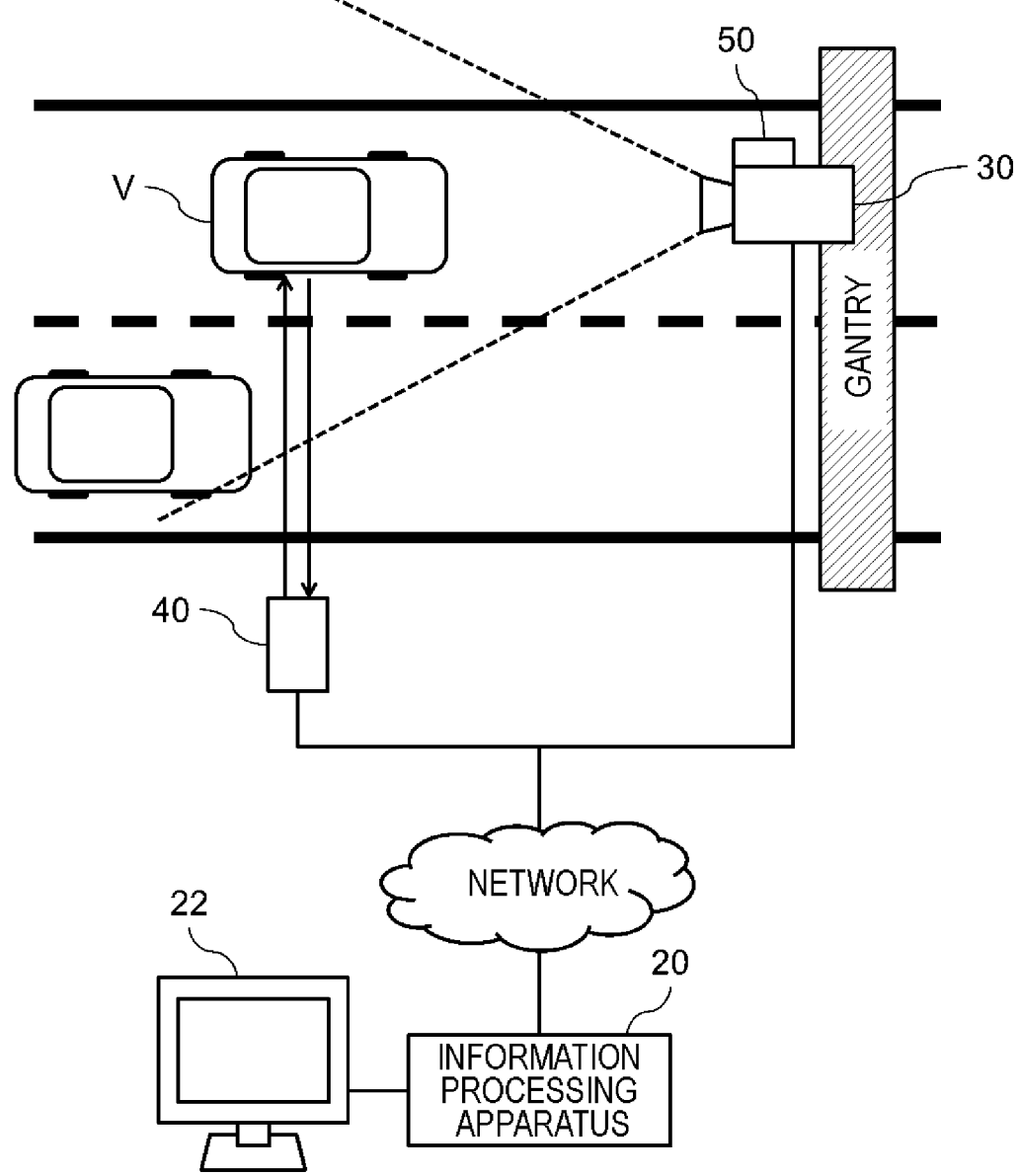
FIG. 14 is a diagram conceptually illustrating another system configuration of the number-of-occupants detection system.

As described above, while the example embodiments of the present invention have been described with reference to the drawings, these example embodiments are exemplifications of the present invention, and various configurations other than those described can also be employed. For example, in each of the example embodiments described above, an example in which the imaging apparatus 30 (imaging unit 110) is provided on the road side has been described, but the imaging apparatus 30 may be provided in a gantry or the like as illustrated in FIG. 14. Even in this configuration, the distance from the imaging apparatus 30 to the vehicle varies depending on the lane in which the vehicle travels, and thus the subject with out-of-focus blur may be captured. In this case, as described in each of the example embodiments described above, a corrected image in which the subject is clearly captured is generated by executing correction processing that reduces blurring of the subject using the parameter according to the position where the vehicle is traveling, thereby capable of accurately counting the number of occupants of the vehicle based on the corrected image.

In the plurality of flowcharts used in the description described above, a plurality of steps (processes) are described in order, but the execution order of the steps executed in each example embodiment is not limited to the description order. In each example embodiment, the order of the illustrated steps can be changed within a range that does not hinder the contents. Each example embodiment described above can be combined in a range in which the contents do not conflict.

Apart or whole of the example embodiments described above may be described as in the following appendices, but are not limited to the following appendices.

1.

A number-of-occupants detection system including:

an image correction unit that generates a corrected image based on an image generated by an imaging unit that images a vehicle traveling on a road having a plurality of lanes by executing correction processing on the image for reducing blurring of a subject captured in the image using a parameter according to a position where the vehicle travels, and a count unit that counts the number of occupants of the vehicle using the corrected image.

2.

The number-of-occupants detection system according to 1, in which, when a plurality of vehicles traveling on different lanes are captured in the image, the image correction unit generates a first corrected image by executing the correction processing using a first parameter according to a position where one vehicle travels and generates a second corrected image by executing the correction processing using a second parameter according to a position where another vehicle travels, and the count unit counts the number of occupants of the one vehicle using the first corrected image and counts the number of occupants of the another vehicle using the second corrected image.

3.

The number-of-occupants detection system according to 1 or 2, in which the image correction unit determines the parameter based on at least one of pieces of information indicating blur of the subject computed using a spatial frequency and an autocorrelation function of the image.

4.

The number-of-occupants detection system according to 1 or 2, in which the image correction unit determines the parameter based on a distance to the vehicle measured by distance a measurement unit that measures the distance to the vehicle.

5.

The number-of-occupants detection system according to any one of 1 to 4, further including:

a storage unit that stores information in which information indicating each of the plurality of lanes is associated with the parameter, in which the image correction unit determines a lane on which the vehicle travels based on the distance to the vehicle, and executes the correction processing using the parameter corresponding to the determined lane.

6.

The number-of-occupants detection system according to any one of 1 to 5, in which a focus distance of the imaging unit is fixed at a distance corresponding to one predetermined lane among the plurality of lanes.

7.

The number-of-occupants detection system according to any one of 1 to 5, in which a focus distance of the imaging unit is fixed at a distance corresponding to a central portion of the plurality of lanes.

8.

The number-of-occupants detection system according to any one of 1 to 5, further including:

a control unit that switches a lane on which the imaging unit is focused based on a traffic volume of each of the plurality of lanes.

9.

The number-of-occupants detection system according to any one of 1 to 5, further including:

a control unit that switches a lane on which the imaging unit is focused according to a date or time.

10.

The number-of-occupants detection system according to any one of 1 to 9, in which the parameter according to the position includes a plurality of parameters different depending on a position in the vehicle, the image correction unit generates a plurality of corrected images based on the image by executing the correction processing on the image using the plurality of parameters different depending on the position in the vehicle, and the count means unit the number of occupants of the vehicle using the plurality of corrected images.

11.

A number-of-occupants detection system including:

an imaging unit that images a vehicle traveling on a road having a plurality of lanes;

a distance measurement unit that measures a distance to the vehicle; and an image processing unit that processes an image generated by the imaging unit, in which the image processing unit acquires information indicating the distance from the distance measurement unit, reduces blurring of a subject captured in the image according to the acquired information, and counts the number of occupants of the vehicle using the image.

12.

A number-of-occupants detection method implemented by a computer including:

generating a corrected image based on an image generated by an imaging unit that images a vehicle traveling on a road having a plurality of lanes by executing correction processing on the image for reducing blurring of a subject captured in the image using a parameter according to a position where the vehicle travels, and counting the number of occupants of the vehicle using the corrected image.

13.

The number-of-occupants detection method according to 12, further including:

when a plurality of vehicles traveling on different lanes are captured in the image, generating a first corrected image by executing the correction processing using a first parameter according to a position where one vehicle travels and generating a second corrected image by executing the correction processing using a second parameter according to a position where another vehicle travels, and counting the number of occupants of the one vehicle using the first corrected image and counting the number of occupants of the another vehicle using the second corrected image.

14.

The number-of-occupants detection method according to 12 or 13, further including:

determining the parameter based on at least one of pieces of information indicating blur of the subject computed using a spatial frequency and an autocorrelation function of the image.

15.

The number-of-occupants detection method according to 12 or 13, further including:

determining the parameter based on a distance to the vehicle measured by distance a measurement unit that measures the distance to the vehicle.

16.

The number-of-occupants detection method according to any one of 12 to 15, further including:

determining a lane on which the vehicle travels based on the distance to the vehicle, reading the parameter corresponding to the determined lane from a storage unit that stores information in which information indicating each of the plurality of lanes is associated with the parameter, and executing the correction processing using the read parameter.

17.

The number-of-occupants detection method according to any one of 12 to 16, in which a focus distance of the imaging unit is fixed at a distance corresponding to one predetermined lane among the plurality of lanes.

18.

The number-of-occupants detection method according to any one of 12 to 16, in which a focus distance of the imaging unit is fixed at a distance corresponding to a central portion of the plurality of lanes.

19.

The number-of-occupants detection method according to any one of 12 to 16, further including:

switching a lane on which the imaging unit is focused based on a traffic volume of each of the plurality of lanes.

20.

The number-of-occupants detection method according to any one of 12 to 16, further including:

switching a lane on which the imaging unit is focused according to a date or time.

21.

The number-of-occupants detection method according to any one of 12 to 20, in which the parameter according to the position includes a plurality of parameters different depending on a position in the vehicle, the method further including:

generating a plurality of corrected images based on the image by executing the correction processing on the image using the plurality of parameters different depending on the position in the vehicle, and counting the number of occupants of the vehicle using the plurality of corrected images.

22.

A number-of-occupants detection method implemented by a computer including:

acquiring an image obtained by imaging a vehicle traveling on a road having a plurality of lanes;

measuring a distance to the vehicle; and reducing blurring of a subject captured in the image according to information indicating the measured distance and counting the number of occupants of the vehicle using the image.

23.

A program for causing a computer to execute the number-of-occupants detection method according to any one of 12 to 22.

The invention claimed is:

1. A number-of-occupants detection system comprising:

an image correction unit that generates a corrected image based on an image generated by an imaging unit that images a vehicle traveling on a road having a plurality of lanes by executing correction processing on the image for reducing blurring of a subject due to a focus distance of the imaging unit; and a count unit that counts the number of occupants of the vehicle using the corrected image, wherein the image correction unit is configured to:
acquire a distance from the imaging unit to the vehicle;
determine a parameter used for the correction processing based on the distance; and
generate the corrected image by executing, on the image, the correction processing with the parameter determined based on the distance.

2. The number-of-occupants detection system according to claim 1, wherein, when a plurality of vehicles traveling on different lanes are captured in the image, the image correction unit generates a first corrected image by executing the correction processing using a first parameter according to a position where one vehicle travels and generates a second corrected image by executing the correction processing using a second parameter according to a position where another vehicle travels, and
the count unit counts the number of occupants of the one vehicle using the first corrected image and counts the number of occupants of the another vehicle using the second corrected image.

3. The number-of-occupants detection system according to claim 1, wherein the image correction unit determines the parameter based on pieces of information indicating a blur of the subject computed using a spatial frequency or an autocorrelation function of the image.

4. The number-of-occupants detection system according to claim 1, wherein the image correction unit determines the parameter based on a distance to the vehicle measured by distance a measurement unit that measures the distance to the vehicle.

5. The number-of-occupants detection system according to claim 1, further comprising:

a storage unit that stores information in which information indicating each of the plurality of lanes is associated with the parameter,
wherein the image correction unit determines a lane on which the vehicle travels based on the distance to the vehicle, and executes the correction processing using the parameter corresponding to the determined lane.

6. The number-of-occupants detection system according to claim 1, wherein a focus distance of the imaging unit is fixed at a distance corresponding to one predetermined lane among the plurality of lanes.

7. The number-of-occupants detection system according to claim 1, wherein a focus distance of the imaging unit is fixed at a distance corresponding to a central portion of the plurality of lanes.

8. The number-of-occupants detection system according to claim 1, further comprising:

a control unit that switches a lane on which the imaging unit is focused based on a traffic volume of each of the plurality of lanes.

9. The number-of-occupants detection system according to claim 1, further comprising:

a control unit that switches a lane on which the imaging unit is focused according to a date or time.

10. The number-of-occupants detection system according to claim 1, wherein the parameter according to the position includes a plurality of parameters different depending on a position in the vehicle,
the image correction unit generates a plurality of corrected images based on the image by executing the correction processing on the image using the plurality of parameters different depending on the position in the vehicle, and
the count unit counts the number of occupants of the vehicle using the plurality of corrected images.

11. A number-of-occupants detection system comprising:
an imaging unit that images a vehicle traveling on a road having a plurality of lanes;
a distance measurement unit that measures a distance to the vehicle; and
an image processing unit that processes an image generated by the imaging unit,
wherein the image processing unit acquires information indicating the distance from the distance measurement unit, reduces blurring of a subject captured in the image according to the acquired information, and counts the number of occupants of the vehicle using the image.

12. A number-of-occupants detection method implemented by a computer comprising:
generating a corrected image based on an image generated by an imaging unit that images a vehicle traveling on a road having a plurality of lanes by executing correction processing on the image for reducing blurring of a subject due to a focus distance of the imaging unit; and
counting the number of occupants of the vehicle using the corrected image,
wherein the method further comprises:
acquiring a distance from the imaging unit to the vehicle;
determining a parameter used for the correction processing based on the distance; and
generating the corrected image by executing, on the image, the correction processing with the parameter determined based on the distance.

13. A number-of-occupants detection method implemented by a computer comprising:
acquiring an image obtained by imaging a vehicle traveling on a road having a plurality of lanes;
measuring a distance to the vehicle; and
reducing blurring of a subject captured in the image according to information indicating the measured distance and counting the number of occupants of the vehicle using the image.

14. A non-transitory computer readable medium storing a program for causing a computer to execute a number-of-occupants detection method, the method comprising:
generating a corrected image based on an image generated by an imaging unit that images a vehicle traveling on a road having a plurality of lanes by executing correction processing on the image for reducing blurring of a subject due to a focus distance of the imaging unit; and
counting the number of occupants of the vehicle using the corrected image,
wherein the method further comprises:
acquiring a distance from the imaging unit to the vehicle;
determining a parameter used for the correction processing based on the distance; and
generating the corrected image by executing, on the image, the correction processing with the parameter determined based on the distance.

15. A non-transitory computer readable medium storing a program for causing a computer to execute a number-of-occupants detection method, the method comprising:
- acquiring an image obtained by imaging a vehicle traveling on a road having a plurality of lanes;
- measuring a distance to the vehicle; and
- reducing blurring of a subject captured in the image according to information indicating the measured distance and counting the number of occupants of the vehicle using the image.

* * * * *